(12) United States Patent  
Siler

(10) Patent No.: US 7,730,708 B2
(45) Date of Patent: Jun. 8, 2010

(54) MOWER BLADE ASSEMBLY

(76) Inventor: M. Dan Siler, 1050 N. Rossiter Terrace, Watkinsville, GA (US) 30677

( * ) Notice: Subject to any disclaimer, the term of this patent is extended or adjusted under 35 U.S.C. 154(b) by 491 days.

(21) Appl. No.: 11/543,571

(22) Filed: Oct. 5, 2006

(65) Prior Publication Data
US 2008/0098706 A1 May 1, 2008

(51) Int. Cl.
A01D 34/73 (2006.01)
(52) U.S. Cl. .......................... 56/255; 56/295
(58) Field of Classification Search ................. 56/17.5, 56/255, 295, DIG. 17, DIG. 20
See application file for complete search history.

(56) References Cited

U.S. PATENT DOCUMENTS

| 2,547,540 | A | * | 4/1951 | Roberts | 56/255 |
| 2,697,322 | A | * | 12/1954 | Watrous | 56/295 |
| 2,764,865 | A | * | 10/1956 | Pollard | 56/295 |
| 2,815,631 | A | * | 12/1957 | Northcote et al. | 56/320.2 |
| 2,837,887 | A | * | 6/1958 | Hansen | 56/295 |
| 2,869,311 | A | * | 1/1959 | Beeston, Jr. | 56/295 |
| 3,162,990 | A | | 12/1964 | Cook | |
| 3,538,692 | A | * | 11/1970 | Cope et al. | 56/295 |
| 3,762,138 | A | * | 10/1973 | Michael | 56/295 |
| 3,769,784 | A | | 11/1973 | Jones | |
| 3,998,037 | A | | 12/1976 | Deans et al. | |
| 4,189,903 | A | | 2/1980 | Jackson et al. | |
| 4,297,831 | A | * | 11/1981 | Pioch | 56/295 |
| 4,429,518 | A | * | 2/1984 | Fedeli | 56/295 |
| 4,995,228 | A | | 2/1991 | Hladik, Jr. | |
| 5,199,251 | A | * | 4/1993 | Rouse et al. | 56/255 |
| 5,233,820 | A | * | 8/1993 | Willsie | 56/255 |
| 5,291,725 | A | | 3/1994 | Meinerding | |
| 5,673,545 | A | * | 10/1997 | Friesen | 56/255 |
| 6,675,569 | B2 | | 1/2004 | Mannon et al. | |
| 6,848,245 | B2 | | 2/2005 | Hancock et al. | |
| 2003/0209000 | A1 | | 11/2003 | Mannon et al. | |
| 2003/0221404 | A1 | | 12/2003 | Hancock et al. | |
| 2006/0168933 | A1 | | 8/2006 | Hill, Jr. | |

FOREIGN PATENT DOCUMENTS

JP    55144937 A  * 11/1980

* cited by examiner

Primary Examiner—Alicia M Torres
(74) Attorney, Agent, or Firm—Baker Donelson

(57) ABSTRACT

A mower blade assembly (10) includes an elongated blade bar (11) having two oppositely disposed cutting ends (13). A pair of removable bottom blades (22) and a pair of removable top blades (23) are removably mounted to the blade bar. The bottom blade has two oppositely disposed serrated cutting edges (27) so that either of the two cutting edges may be utilized for cutting purposes. Each top blade has a forward portion (31) which includes a series of blade segments (32) with serrated cutting edges (33) and a series of mulching blades (34) with serrated cutting edges (35). The top blade also has an elongated rear portion (37) that is oriented at an angle with respect to the cutting blades and blade bar. The angle of the rear portion creates or defines an airfoil deflector which increases the vacuum effect of the rotating blades.

20 Claims, 2 Drawing Sheets

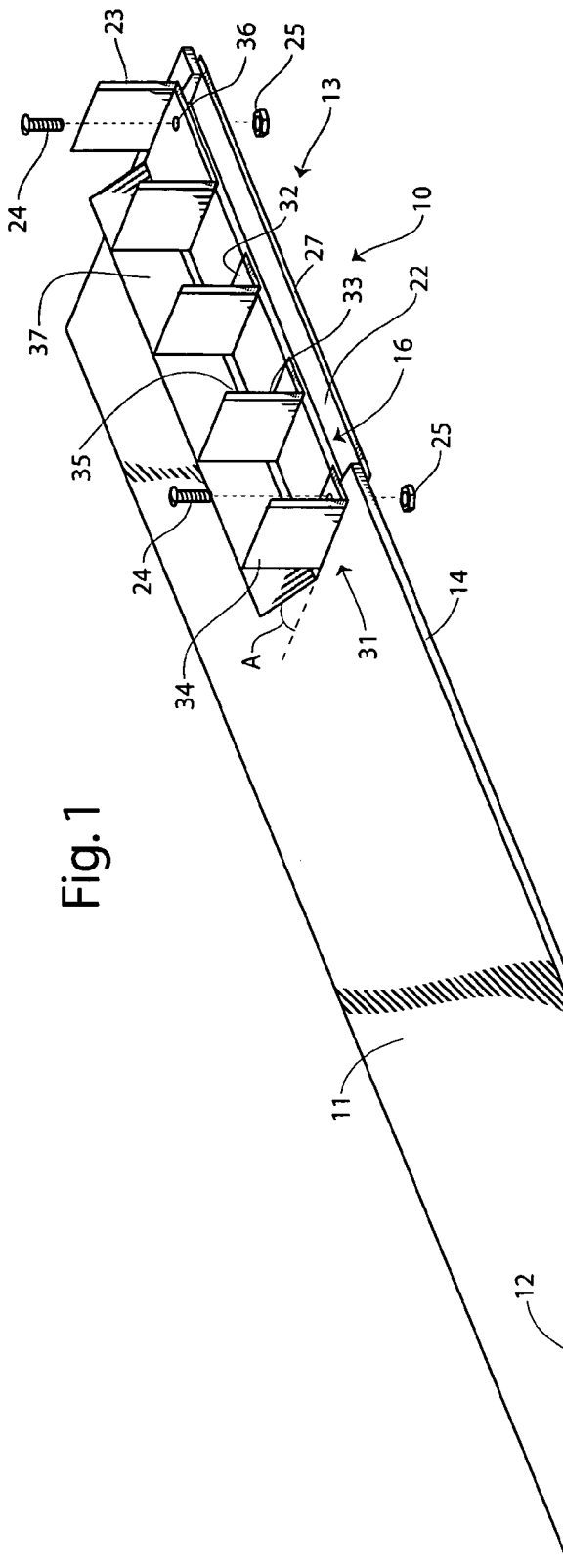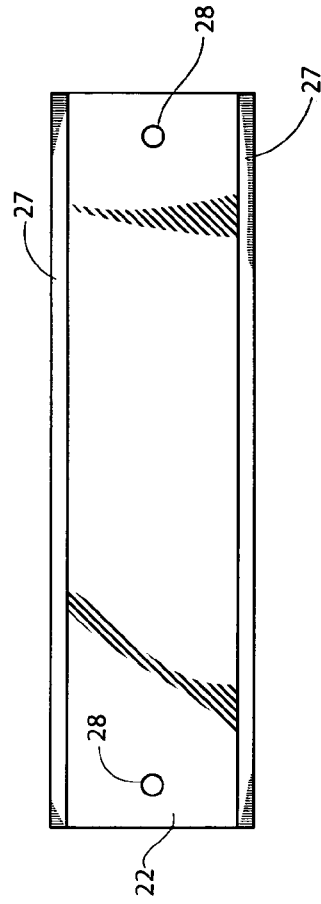

MOWER BLADE ASSEMBLY

This invention relates to lawnmower blades, and specifically to rotary lawnmower blade assemblies.

BACKGROUND OF THE INVENTION

Rotary lawnmowers utilize a blade that is rotated about a central axis by a motor. The blade includes two oppositely disposed leading edges which cut the grass over which the lawnmower passes. These grass clippings are oftentimes collected in a removable bag so that the clippings may be gathered and disposed.

The mower operator however may opt to leave the grass clippings on the lawn for mulch with subsequent decomposition for fertilization and a reduction in water needs for the lawn. When grass clippings are left on the lawn it is desired to have the clippings cut into the smallest pieces possible so that they do not rest upon the freshly cut grass, this is referred to as mulching the grass.

Accordingly, it is seen that a need for a lawnmower blade which may reduce the size of grass clipping. It thus is to the provision of such that the present invention is primarily directed.

SUMMARY OF THE PRESENT INVENTION

In a preferred form of the invention, a mower blade assembly comprises a blade bar having a central engine mounting hole and two oppositely disposed cutting ends having a leading edge. The blade assembly has a pair of top cutting blades removably mounted to the blade bar. Each top cutting blade is mounted to one cutting end of the blade bar and has a first portion overlying the blade bar and a second portion angled with respect to the blade bar to create an airfoil deflector. The first portion has an elongated cutting edge.

In another preferred form of the invention, a mower blade assembly comprises a blade bar having a central engine mounting hole and two oppositely disposed cutting ends having a leading edge. The blade assembly also has a pair of bottom cutting blades with each bottom cutting blade being removably mounted to one cutting end of the blade bar. Each bottom cutting blade also has two oppositely disposed elongated cutting edges. With this construction, either cutting edge of the bottom cutting blade may be positioned forwardly with respect to blade movement, and when one cutting edge becomes dull the position of the bottom cutting blade may be removed and remounted so that the other cutting edge is positioned forwardly with respect to blade movement.

In another preferred form of the invention, a mower blade assembly comprises a blade bar having a central engine mounting hole and two oppositely disposed cutting ends having a leading edge. The blade assembly also has a pair of bottom cutting blades removably mounted to the blade bar and has an elongated cutting edge. Each bottom cutting blade is mounted to one cutting end of the blade bar. The blade assembly also includes a pair of top cutting blades removably mounted to the blade bar and having an elongated cutting edge. Each top cutting blade is mounted to one cutting end of the blade bar.

BRIEF DESCRIPTION OF THE DRAWINGS

FIG. 1 is a perspective view of a mower blade assembly in a preferred form of the invention.

FIG. 2 is a top view of the bottom blade of the mower blade assembly of FIG. 1.

DETAILED DESCRIPTION

Figure 3:
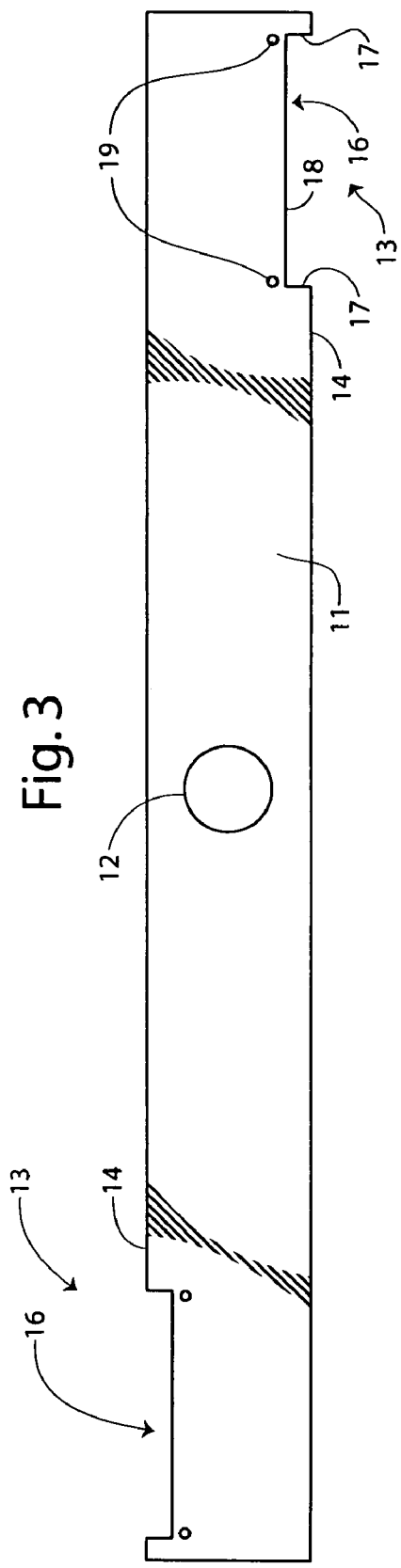
FIG. 3 is a top view of the blade bar of the mower blade assembly of FIG. 1.

With reference next to the drawings, there is shown an lawn mower blade assembly 10 in a preferred form of the invention. The mower blade assembly 10 includes an elongated blade bar 11 having a central mounting hole 12, configured to receive the rotating axis of a lawn mower engine, and two oppositely disposed cutting ends 13. Each cutting end 13 has a leading edge 14 and an elongated notch 16 extending inwardly from the leading edge 14. The leading edges 14 are oriented forwardly with respect to the direction of blade movement during rotation. Each notch 16 in the preferred embodiment is defined by two side walls 17 and a rear wall 18, as best shown in FIG. 3. The blade bar 11 also has two pairs of blade mounting holes 19 adjacent each notch 16.

The mower blade assembly 10 also includes a pair of removable bottom blades 22 and a pair of removable top blades 23. The bottom blades 22 and top blades 23 are mounted to the blade bar 11 adjacent the notch 16 through two pairs of bolts 24 and mating self-locking nuts 25.

With reference next to FIG. 2, the bottom blade 22 is elongated with two oppositely disposed serrated cutting edges 27 and two mounting holes 28. The bottom blade 22 is symmetrical with respect to its longitudinal length so that either one of the two cutting edges 27 may be oriented forward of the blade bar leading edge 14 and thereby be utilized for cutting purposes.

Figure 4:
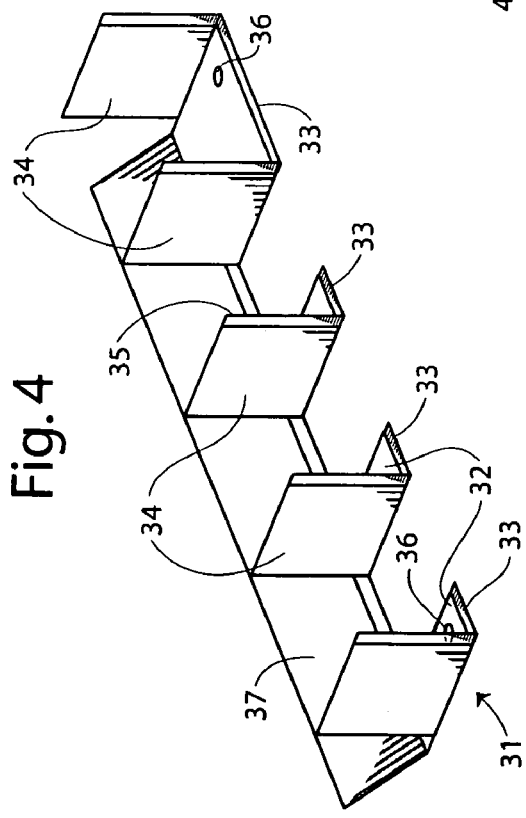
FIG. 4 is a perspective view of the top blade of the mower blade assembly of FIG. 1.

With reference next to FIG. 4, the top blade 23 has a forward portion 31 at least partially overlying the blade bar 11. Each forward portion 31 includes a series of generally horizontal cutting blades or blade segments 32 with serrated cutting edges 33, a series of generally vertical mulching blades 34 with serrated cutting edges 35, and a pair of mounting holes 36. The cutting edges 33 of the cutting blades 32 are mutually aligned with each other and positioned slightly forward of the notch rear wall 18.

The top blade 23 also has an elongated rear portion 37 that is oriented at an angle A with respect to the cutting blades 32 and blade bar 11. The angle of the rear portion 37 creates or defines an airfoil deflector which increases the vacuum effect of the rotating blades. The top and bottom blades 23 and 22 are made of a hardened metal and may be coated in whole or in part, especially along the cutting edges, with a titanium coating to enhance the edge holding capabilities of the blades.

In use, the top blade 23 is positioned on top of the blade bar 11 and mounting bolts 24 are passed through respective mounting holes 36 and 19. The bottom blade 22 is then coupled to the blade bar 11 by similarly passing the mounting bolts 24 through its mounting holes 28. Locking nuts 25 are then fastened to the mounting bolts 24 to lock the positions of the top and bottom blades to the blade bar.

The rotation of the blade assembly causes the bottom blade cutting edge 27 and the top blade cutting edges 33 to cut the grass blades. These freshly severed grass blades then impact the mulching blades cutting edges 35, whereby they are chopped into smaller grass segments or clippings. The multiple impacting of the bottom blades 22 and top blade cutting blades 32 and mulching blades 34 creates a grass clipping with a very small length, i.e., they create a finely chopped grass mulch. It is believed that the airfoil deflector maintains the grass clippings in suspension above the grass for a longer period of time, thereby allowing more impacts with the cutting edges and a resulting finer sized grass clipping.

It should be noted that if the forwardly positioned cutting edge 27 of the bottom blade becomes dull, the bottom blade may be removed and reoriented so that its second cutting edge 27 is positioned to cut the underlying grass. This reversing of the bottom blade enables it to be used twice as long before having to be manually sharpened. The rotation of the blade assembly causes the bottom blade cutting edge 27 and the top blade cutting edges 33 to cut the grass blades. These freshly severed grass blades then impact the mulching blades cutting edges 35, whereby they are chopped into smaller grass segments or clippings. The multiple impacting of the grass blades creates a grass clipping with a very small length.

Figure 5:
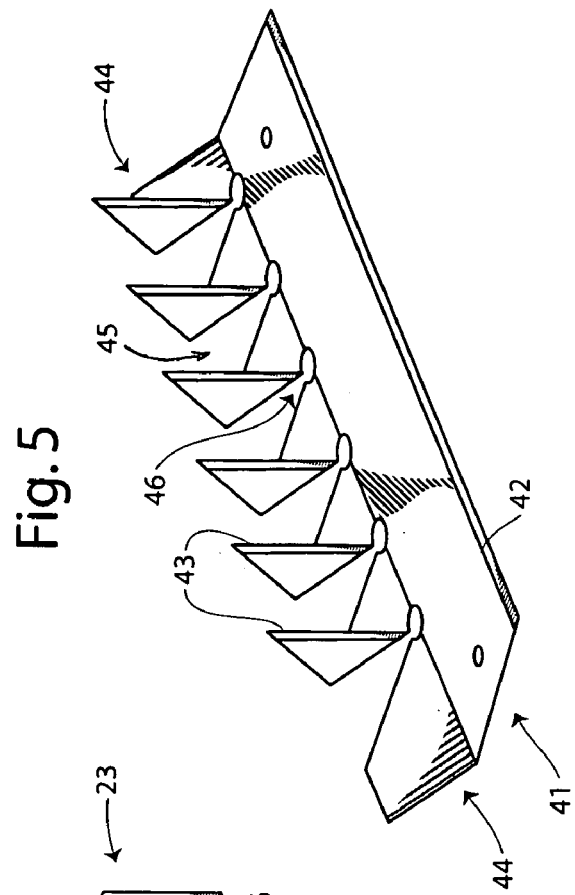
FIG. 5 is a perspective view of a top blade in another preferred form of the invention.

With reference next to FIG. 5, there is shown a top blade 41 in another preferred form of the invention. Here, the top blade 41 has a continuous serrated cutting edge 42. Furthermore, the mulching blades 43 are positioned upon the angled rear portion 44 which forms the airfoil deflector. Generally triangular notches 45 terminating with cleaning holes 46 extend from the trailing edge. The cleaning holes 46 allow air to flow therethrough preventing the buildup of grass debris.

It should be understood that even though the mulching blades have been shown with their cutting edges in a generally vertical orientation, the present invention is not limited to such. As such, the term vertical is intended to reference an upward direction and as used herein is not intended to represent a direction exactly perpendicular to a horizontal reference as the mulching blades may be leaned to one side or the cutting edge angled with respect to the vertical. It should also be understood that the number of mulching blades may vary and are not limited to the number shown in the preferred embodiments.

It should be understood that the notches in the blade bar may extend to the end of the blade bar. As such, the term notch is not intended to be limited to a space defined on three sides and may includes a step or other recess within the blade bar. It should also be understood that the top and bottom blades may be mounted to the blade bar in any other conventionally known fashion, such as with tongue and groove fasteners, screws, clamps, catches, pins or other similar devices.

It thus is seen that a lawn mower blade assembly is now provided that provides superior mulching capabilities. It should be understood that many modifications may be made to the specific preferred embodiment described herein, in addition to those specifically recited, without departure from the spirit and scope of the invention as described by the following claims.

The invention claimed is:

1. A mower blade assembly comprising:
a blade bar having two oppositely disposed generally planar cutting ends lying in a generally horizontal plane and having a leading edge with respect to said blade bar direction of operational movement within said horizontal plane, each said cutting end having an elongated notch extending along said cutting end leading edge and extending in the longitudinal direction of said blade bar and within said horizontal plane;
a pair of bottom cutting blades removably mounted to said blade bar and having an elongated cutting edge, each bottom cutting blade being mounted to one said cutting end of said blade bar with said bottom cutting blade elongated cutting edge being positioned below one said cutting end notch and also being a leading edge with respect to the bottom cutting blade direction of operational movement; and
a pair of top cutting blades removably mounted to said blade bar and having an elongated cutting edge, each top cutting blade being mounted to one said cutting end of said blade bar and having said top cutting blade elongated cutting edge being positioned above one said cutting end notch and being aligned generally parallel with said bottom cutting blade elongated cutting edge.

2. The mower blade assembly of claim 1 wherein each bottom cutting blade has two oppositely disposed elongated cutting edges.

3. The mower blade assembly of claim 1 wherein each said top cutting blade has a first portion overlying said blade bar and a second portion angled with respect to said blade bar to create an airfoil deflector, said first portion having said top cutting blade elongated cutting edge.

4. The mower blade assembly of claim 1 wherein each said top cutting blade also includes a plurality of mulching blades extending upwardly with respect to said blade bar.

5. The mower blade assembly of claim 1 wherein each said top cutting blade has a first portion overlying said blade bar, a second portion angled with respect to said blade bar to create an airfoil deflector, and a plurality of mulching blades extending from said first portion.

6. The mower blade assembly of claim 1 wherein each said top cutting blade has a first portion overlying said blade bar, a second portion angled with respect to said blade bar to create an airfoil deflector, and a plurality of mulching blades extending from said second portion.

7. The mower blade assembly of claim 1 wherein each cutting edge of said bottom cutting blade is positioned ahead of said cutting edge of said upper cutting blade, with respect to the direction of blade movement.

8. The mower blade assembly of claim 1 wherein at least said cutting edge of said top cutting blade is coated with titanium.

9. The mower blade assembly of claim 1 wherein at least said cutting edges of said bottom cutting blades are coated with titanium.

10. The mower blade assembly of claim 1 wherein said top blade is comprised of a plurality of spaced apart blade segments and said blade segments include said top blade cutting edge.

11. The mower blade assembly of claim 1 wherein said bottom cutting blades elongated cutting edge and said top cutting blades elongated cutting edge associated with each blade bar cutting end are aligned generally parallel with said blade bar leading edge.

12. A mower blade assembly comprising:
a blade bar having two oppositely disposed generally planar cutting ends lying in a generally horizontal plane and having a leading edge, each said cutting end having an elongated notch extending along said cutting end leading edge and extending in the longitudinal direction of said blade bar and within said horizontal plane;
a pair of bottom cutting blades extending from said blade bar and having an elongated cutting edge, each bottom cutting blade being removably mounted to one said cutting end of said blade bar and said bottom cutting blade elongated cutting edge being positioned below one said cutting end notch; and
a pair of top cutting blades removably mounted to said blade bar and having an elongated cutting edge, each top cutting blade being mounted to one said cutting end of said blade bar and having said top cutting blade elongated cutting edge being positioned above one said cutting end notch.

13. The mower blade assembly of claim 12 wherein each bottom cutting blade has two oppositely disposed elongated cutting edges.

14. The mower blade assembly of claim 12 wherein each said top cutting blade has a first portion overlying said blade bar and a second portion angled with respect to said blade bar to create an airfoil deflector, said first portion having said top cutting blades elongated cutting edge.

15. The mower blade assembly of claim 12 wherein each said top cutting blade also includes a plurality of mulching blades extending upwardly with respect to said blade bar.

16. The mower blade assembly of claim 12 wherein each said top cutting blade has a first portion overlying said blade bar, a second portion angled with respect to said blade bar to create an airfoil deflector, and a plurality of mulching blades extending from said first portion.

17. The mower blade assembly of claim 12 wherein each said top cutting blade has a first portion overlying said blade bar, a second portion angled with respect to said blade bar to create an airfoil deflector, and a plurality of mulching blades extending from said second portion.

18. The mower blade assembly of claim 12 wherein each cutting edge of said bottom cutting blade is positioned ahead of said cutting edge of said upper cutting blade, with respect to the direction of blade movement.

19. The mower blade assembly of claim 12 wherein said top blade is comprised of a plurality of spaced apart blade segments and said blade segments include said top blade cutting edge.

20. The mover blade assembly of claim 12 wherein said pair of bottom cutting blades is removably mounted to said blade bar.

\* \* \* \* \*